United States Patent [19]

Sonoda et al.

[11] Patent Number: 4,473,352
[45] Date of Patent: Sep. 25, 1984

[54] DOUBLE-INCLINE SHAFT KILN

[75] Inventors: Hiraku Sonoda; Setsuo Tamura, both of Chiba, Japan

[73] Assignee: Nippon Lime, Ltd., Japan

[21] Appl. No.: 434,588

[22] Filed: Oct. 15, 1982

[30] Foreign Application Priority Data

Nov. 5, 1981 [JP] Japan .................................. 56-176432

[51] Int. Cl.³ ............................................. F27B 15/00
[52] U.S. Cl. ........................................ 432/96; 432/97; 432/99; 432/101
[58] Field of Search ...................... 432/96, 97, 99, 101

[56] References Cited

U.S. PATENT DOCUMENTS

| | | | |
|---|---|---|---|
| 233,520 | 10/1880 | Knox et al. | 432/99 |
| 534,517 | 2/1895 | Prestone | 432/101 |
| 1,074,519 | 9/1913 | Mullen | 432/99 |
| 2,597,585 | 5/1952 | Howard | 432/99 |
| 2,670,946 | 3/1954 | Royster | 432/101 |
| 3,142,480 | 7/1964 | Azbe | 432/99 |
| 3,429,462 | 2/1969 | Frederiksen et al. | 432/97 |
| 3,958,919 | 5/1976 | Kjell-Berger | 432/99 |
| 4,289,481 | 9/1981 | Yano | 432/96 |
| 4,346,661 | 8/1982 | Nakamura | 432/97 |
| 4,351,119 | 9/1982 | Meunier | 432/96 |

Primary Examiner—Henry C. Yuen
Attorney, Agent, or Firm—Hill, Van Santen, Steadman & Simpson

[57] ABSTRACT

In a double-incline shaft kiln in which ore materials are charged into the furnace from the top of a vertical external portion of the shaft and are calcined by burners installed in the lower portion of the shaft, the calcining zone is effectively extended by the provision of an injector which causes the hot gas to flow in the lower portion of the shaft parallel to the flow of ore materials. Further, at the turnover locations for the ore descending through the shaft, the width of the shaft is broken into at least two portions which promotes a more even velocity of the material flow across the width of the shaft so as to enable combustion control and the prevention of the ash of solid fuel, such as coal, from mixing with the calcined material to cause discoloration and lumps.

1 Claim, 5 Drawing Figures

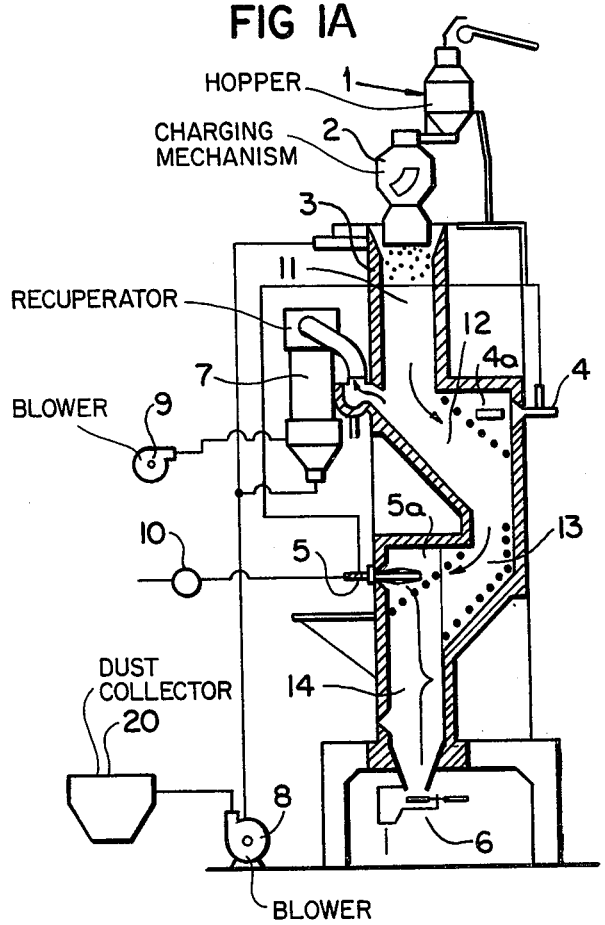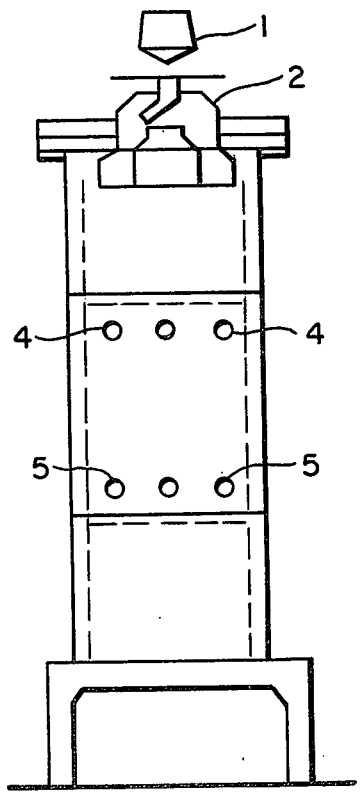

PRIOR ART
FIG. 2
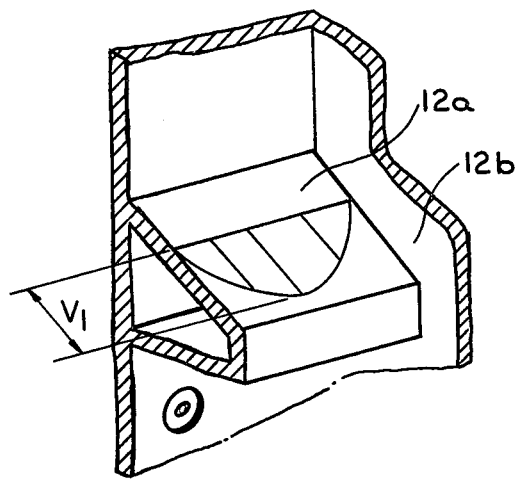
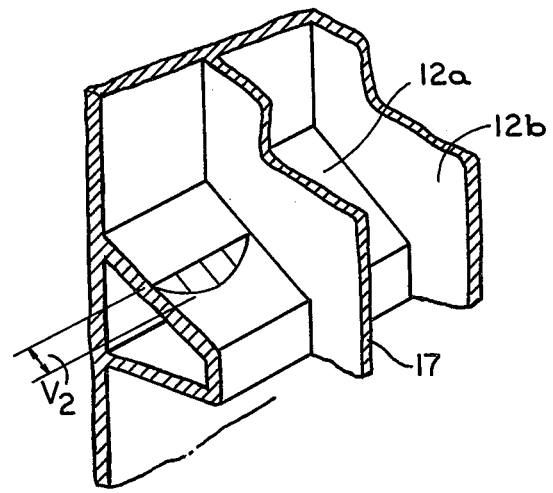
FIG. 3

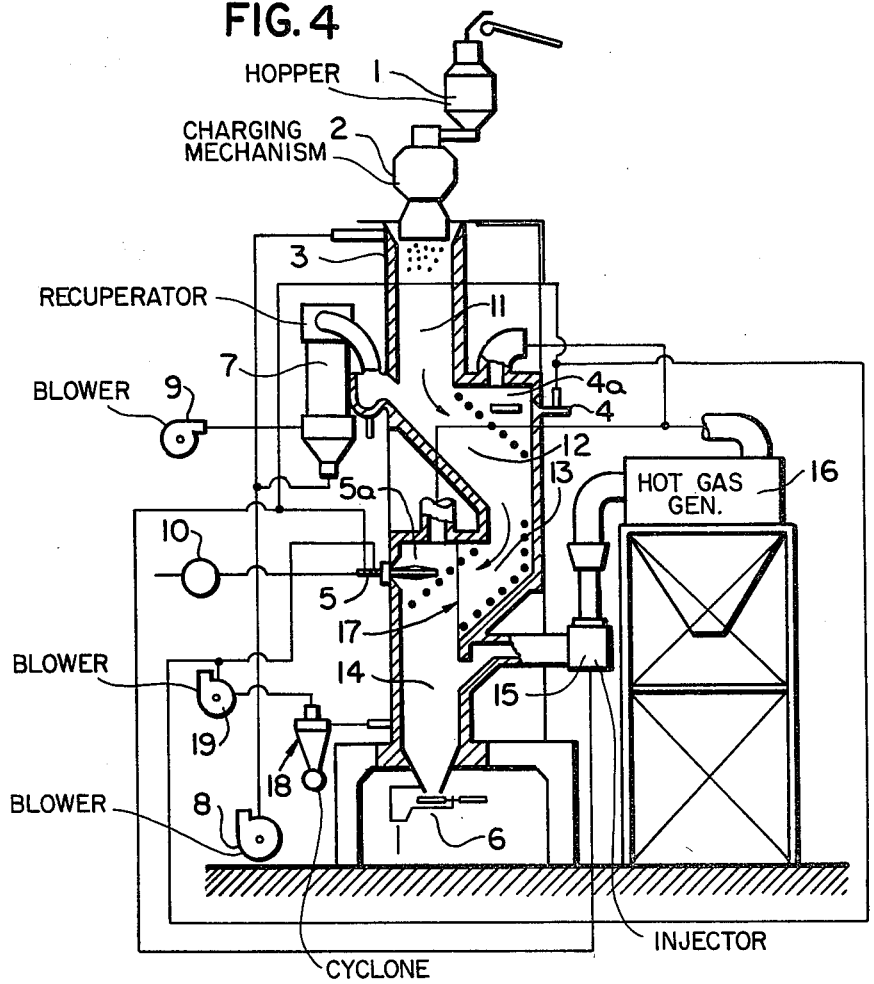

DOUBLE-INCLINE SHAFT KILN

BACKGROUND OF THE INVENTION

1. Field of the Invention

The present invention relates to a double-incline shaft kiln which calcinates limestone, dolomite, magnesite and other similar materials.

2. Description of the Prior Art

A type of conventional incline shaft kiln comprises a construction as is illustrated in FIGS. 1a and 1b. Ore carried by a belt conveyor is deposited into a charging hopper 1 at the top of the shaft kiln from which the ore is permitted to fall into an upper external portion of a shaft 3 via a charging mechanism 2. The material thus loaded into the shaft is preheated while descending through a preheating zone 11 by ascending hot gas. The preheated ore than passes through an upper calcining zone 12 where burning occurs by hot gas heated by an upper burner 4. The calcined materials further move down into a lower calcining zone 13 which is sloped in a direction opposite to that of the upper calcining zone 12 so that the calcined materials (ores) are turned over.

The calcined material is further roasted by a lower burner 5 in the lower calcining zone 13 and then falls down through the cooling zone 14 where it is cooled by cool air blowing in from an exhaust portion.

The calcined ore, thus cooled, is discharged out of the furnace by a piston-type discharging mechanism 6.

A portion of the hot gas is extracted from between the upper calcining zone 12 and the preheating zone 11 to preheat the combustion chamber in a recuperator 7. The remaining hot gas is used to preheat the material to be calcined. These hot gases are collected together by an exhaust gas fan 8 and passed through a dust collector 20 where they are cleansed of dust and then discharged into the open air.

Air to be used for combustion is fed by a blower 9 to the recuperator 7 where it is heated by the hot exhaust gas. The heated air is used for the burners 4 and 5 which are connected to a source of fuel (not shown).

The burners are located at the repose angle of the material and the upper and lower burning spaces 4a and 5a.

The upper burners 4, located in the upper burning space 4a, are operated at the ratio of theoretical combustion air of about 0.5 to roast the material using excess air from the lower burner.

The lower burners 5 are operated at the theoretical combustion air ratio of about 1.8, also using the cooling air.

The conventional double-incline shaft kiln of the above construction has the following drawbacks:

(1) As illustrated in FIG. 2, an inclined surface 12a is formed in the upper calcining zone 12 to turn over the ore. The speed at which the ore runs down the inclined surface 12a at the sidewall 12b is smaller than the speed of the material at the central portion of the inclined surface.

The time during which the ore stays on the inclined surface 12a differs beginning from the location thereof on the surface 12a, resulting in partial or uneven calcination of ore. In FIG. 2, the falling speed difference of ore is indicated by the superposed graphic illustration with the various velocities referenced v1.

(2) When solid fuels such as coals are used, they fall together with ore from the top of the furnace, mixing with the same, and burn using excess air contained in the ascending hot gas. The ore adjacent to the solid fuels are over-burned, resulting in partial or uneven calcination, and it is difficult to control the roasting condition.

As a result, ash of solid fuel fuses to the surface of calcined material resulting in coloring of the calcined material and formation of blocks. The ash of solid fuel mixes with the calcined material and thus deteriorates the quality of product.

(3) Because the calcining zone is short, a finish calcination cannot be done to those materials that are under-calcined, therefore, it is impossible to ensure products (calcined material) of good quality.

(4) Since the furnace is capable of calcining small grains of ore of about 5–30 mm in diameter, the gas pressure loss in the cooling zone 14 is large, which, in turn, reduces the amount of cooling air flowing in, thereby reducing the cooling effect on the product (calcined material) and reducing the heat recovery rate.

SUMMARY OF THE INVENTION

In order to overcome the above drawbacks, the present invention has an object of providing a double-inclined shaft kiln which is excellent in heat recovery ratio and which minimizes partial or uneven calcination and prevents ash of solid fuel from mixing with the calcined material.

The above object is achieved in a shaft kiln of the type set forth above by the provision of an injector which causes the high gas to flow in the lower calcining zone parallel to the flow of ore materials.

According to another feature of the invention, a partition wall is provided in the upper and lower calcining zone to reduce the width of the ore flow and thereby minimize the variation in the speed at which the ore flows downwardly through the shaft.

According to another feature of the invention, a hot gas generator is provided outside of the furnace to enable the use of solid fuel and supply a hot gas into the furnace which has impurities removed therefrom.

According to another feature of the invention, preheated air is extracted from the intermediate portion of the cooling zone and is used as combustion air for the burner.

BRIEF DESCRIPTION OF THE DRAWINGS

Other objects, features and advantages of the invention, its organization, construction and mode of operation will be best understood from the following detailed description, taken in conjunction with the accompanying drawings, on which:

FIGS. 1a and 1b are vertical sectional front and side views, respectively, illustrating a conventional structure of a double-inclined shaft kiln;

FIG. 2 is a fragmentary perspective view illustrating the flow condition of ores in the conventional structure of FIGS. 1a and 1b;

FIG. 3 is a fragmentary perspective view of apparatus for altering the flow condition by decreasing the flow width and decreasing the speed of flow of material through the shaft; and FIG. 4 is a front sectional view of a double-incline shaft kiln constructed in accordance with the invention and illustrating specific features of the invention.

DESCRIPTION OF THE PREFERRED EMBODIMENTS

The prior art structure of FIGS. 1a, 1b and 2 have already been discussed above and need not be treated further herein.

Referring to FIGS. 3 and 4, an embodiment of the invention employs a construction in which a wall or walls are provided, more specifically a center wall 17 is provided, at the incline surface 12a to divide the space in the furnace so as to reduce the velocity variations v of the falling ore over the width of the incline surface 12a and thereby minimize partial or uneven calcination of ores.

Referring to FIG. 4, this embodiment also employs a hot gas generator 16 to supply the hot gas to the upper and lower combustion spaces 4a and 5a thereby enabling combustion control and preventing the ash of solid fuel, such as coals, from mixing with the calcined material. The hot gas generator 16 is supplied with two kinds of hot air for combustion to produce a hot gas at a temperature of about 1300° C. This is the air used to cool the product (calcined material) and a part of the gas burned in the lower combustion space 5a are taken into an injector 15. This mixture of gases (800°–900° C.) and a portion of the preheated air used to cool the product are fed to a cyclone 18 by a blower 19.

The ash of the burned solid fuel forming in the hot gas generator 16 is discharged from the bottom of the hot gas generator 16.

A portion of the gas burned in the lower combustion space 5a is fed in the same direction as the flow of the ore and is drawn into the injector 15 so as to increase the length of the calcining zone and thus provide a sufficient calcination.

The injector 15 uses the operating air which was delivered from the blower 9 into the recuperator 7 where it was preheated and pressurized to 530° C. and 5000 mm Aq.

To improve the heat recovery ratio in the cooling zone 14, a portion of the air preheated to 300° C. is drawn from the cooling zone 14 into the cyclone 18 where it has dust removed therefrom and is then sent by the combustion air blower 19 to the burners 4 and 5.

In summary, the present invention has the following structural features:

The center wall 17 (FIG. 3) reduces the uneven or nonuniform flow of ore and gas thereby preventing partial or uneven calcination of ore;

The injector 15 provides a hot gas flow parallel to the flow of ore which, in turn, elongates the calcining zone thereby giving a finish calcination to the ore and assuring a high quality product (calcined material);

Further, since the hot gas generator is provided outside of the furnace, solid fuel such as coals can be used to produce a clean hot gas by burning the solid fuel and removing the ash. This construction ensures as high a quality product without impurities like ash at a low cost as those obtained using oil or gas fuel; and Moreover, since the preheated air is taken from an intermediate portion of the cooling zone, the heat and recovery ratio of the product is high, resulting in a reduction in the product temperature and heat consumption.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A double incline shaft kiln comprising:
 (a) a vertical shaft including an upper portion for receiving raw ore to flow downwardly through said shaft, a first incline surface for receiving the flowing ore, a first burner for heating the falling ore in an upper combustion zone adjacent said first incline surface, a second incline surface below and oblique to said first incline surface for receiving the ore flowing from said first incline surface, a second burner for heating the ore in a lower combustion zone adjacent said second incline surface, a product cooling zone below said second incline surface, and a pipe system connecting said upper, lower and product cooling zones including an injector for sucking heated gas from said product cooling zone and a hot gas generator connected to said injector and operable to heat gas and through said pipe system cause the heated gas to flow through said lower combustion zone in the direction of flow of the ore;
 (b) a preheating air-extracting and feed system in said pipe system including a cyclone connected in communication with said product cooling zone and a blower connected between said cyclone and said first and second burners for extracting preheated gas subjected to a heat exchange in said product cooling zone and supply the same to said first and second burners; and
 (c) partition walls in said upper and lower combustion zones and on said first and second incline surfaces for reducing the width of the flow of the ore with respect to the direction of ore flow to minimize variations in the flow rate of the ore.

* * * * *